H. E. BUC.
CHLORINATION OF ISOPROPYL ALCOHOL.
APPLICATION FILED NOV. 4, 1920.
1,436,378.
Patented Nov. 21, 1922.
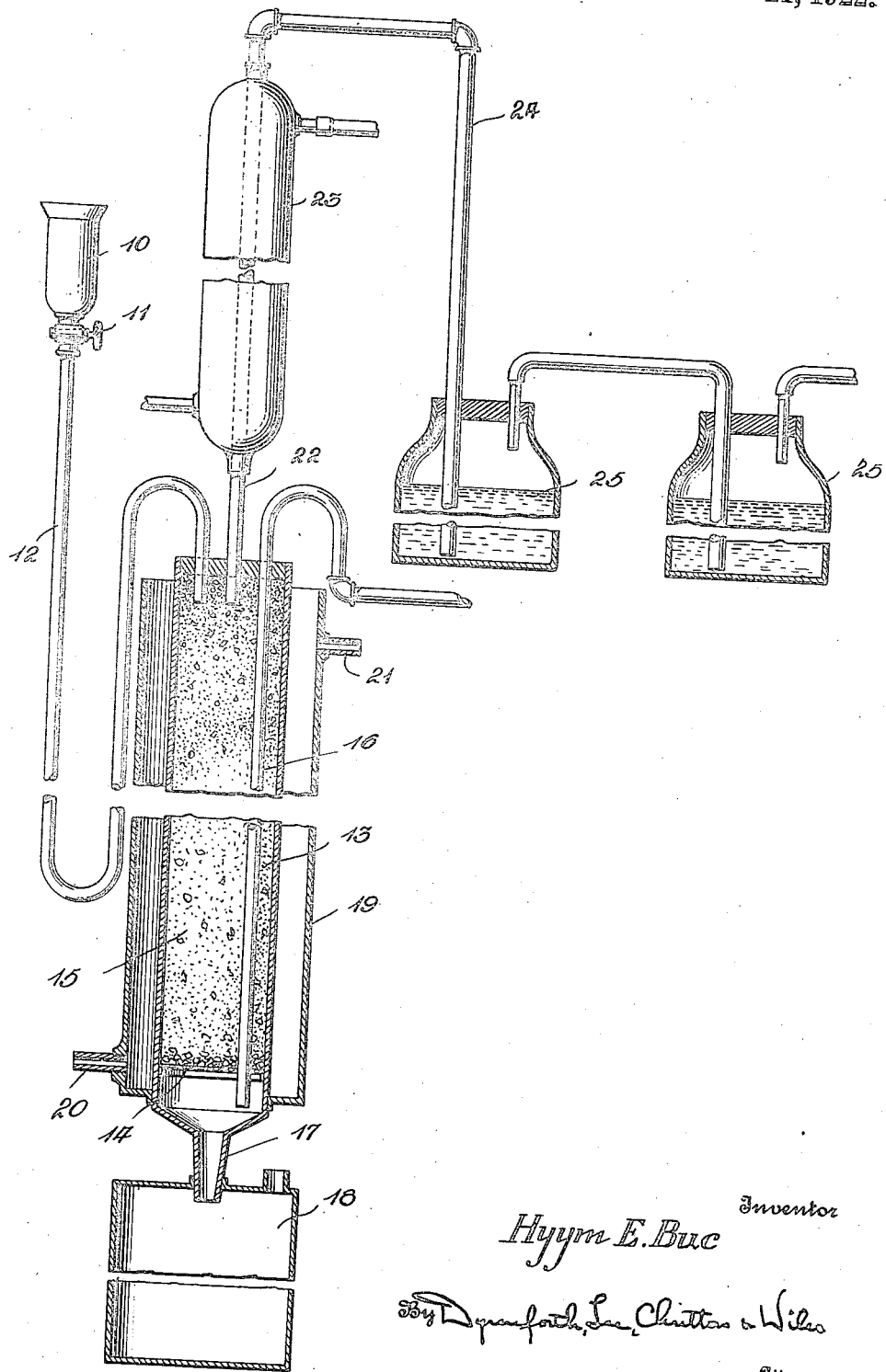
Hyym E. Buc, Inventor
By Dyrenforth, Lee, Chritton & Wiles, Attorneys Patented Nov. 21, 1922.

1,436,378

UNITED STATES PATENT OFFICE.

HYYM E. BUC, OF ROSELLE, NEW JERSEY, ASSIGNOR, BY MESNE ASSIGNMENTS, TO STANDARD DEVELOPMENT COMPANY, OF NEW YORK, N. Y., A CORPORATION OF DELAWARE.

CHLORINATION OF ISOPROPYL ALCOHOL.

Application filed November 4, 1920. Serial No. 421,730.

*To all whom it may concern:*

Be it known that I, HYYM E. BUC, a citizen of the United States, residing at Roselle, in the county of Union and State of New Jersey, have invented a new and useful Improvement in the Chlorination of Isopropyl Alcohol, of which the following is a specification.

The present invention relates to the chlorination of isopropyl alcohol, and more particularly to its chlorination for the production of chlor-acetones. It will be fully understood from the following specification, illustrated by the accompanying drawing, which shows diagrammatically and partially in section apparatus suitable for carrying out the invention.

In accordance with the present invention isopropyl alcohol, either anhydrous or in the presence of water, is subjected to the action of chlorine, preferably in excess, under controlled conditions of temperature such that chlor-acetones are formed and the formation of chlor-hydrocarbons is inhibited. The chlor-acetones are then separated from the unreacted-upon alcohol and water, if any be present, and are found to comprise dichloracetone (asym.) and trichloracetone (such as 1.3.3) with varying, but relatively small, amounts of tetrachloracetone (sym.) and pentachloracetone.

In order that the present invention may be clearly understood, reference is made in the following detailed description of the process to the accompanying drawing, in which the numeral 10 indicates a supply receptable for isopropyl alcohol, which discharges the alcohol through a valve 11 and tube 12 formed to provide a U-shaped liquid trap into the top of tower 13. The tower is provided near its bottom with a perforated plate 14 which supports the packing material 15 which fills the tower. This packing material may be of a suitable inert substance, such as pumice, coke, ceramic material or the like. A pipe 16, shown as passing through the top of the tower, extends to a point below the perforated supporting plate 14 and serves for the introduction of chlorine gas into the bottom of the tower. The tower is provided at its bottom with a discharge outlet 17, through which it empties into a suitable receptacle 18. The tower 13 is provided with a suitable jacket 19 having inlet and outlet openings 20 and 21 for the introduction of heating or cooling media as required.

At its top the tower 13 is provided with an outlet pipe 22 leading into a cooled reflux condenser 23, from which a gas escape conduit 24 leads to the absorbers 25, 25, arranged in series.

In carrying out the process of the present invention isopropyl alcohol, which may contain some water, (for example, the constant boiling point mixture containing approximately 12% water by volume) is fed slowly from container 10 through trapped pipe 12 into the top of tower 13. Chlorine is admitted at the same time through pipe 16 and rises in the tower in countercurrent to the descending liquid. The rate of flow of the chlorine is adjusted so as to provide an excess over that required by the reaction, this being clearly shown by the passage of chlorine through the system into the absorbers. The temperature in the tower is controlled, if necessary, by the circulation of heated or cooled water through jacket 19 so as to be above 35° C. and preferably not above 70° C. At working temperatures between 45° C. and 65° C. efficient yields are secured, the optimum temperature of operation being about 65° C. The reaction takes place at temperatures above 70° C., but at such higher temperature excessive amounts of chlorinated hydrocarbons are formed with corresponding reduction in the yields of chloracetones. Ordinarily the heat developed by the reaction in the tower is sufficient to maintain the desired temperature of reaction or even to necessitate cooling. Where dilute isopropyl alcohol, or isopropyl alcohol which has been already subjected to reaction with chlorine, is treated, heating may be necessary during the entire reaction.

The liquid products of reaction in the tower descend into receptacle 18, in which there is a separation into two layers; a lower, heavy layer comprising principally chloracetones, and an upper layer containing unreacted-upon isopropyl alcohol, water and HCl formed in the reaction, together with some water-soluble chloracetones. Vapor products of reaction together with excess chlorine pass off through the reflux condenser, where they are partially condensed, and into the series of absorbers, 25, 25, which contain water. In the latter some chloracetones are deposited as a lower oily layer and some are dissolved in the water present. The oily layer of chloracetones from the absorbers may be combined with that from the receptacle 18, and the aqueous liquid separately treated for recovery of the chloracetones therefrom. The oily liquid will, in general, contain chlorinated hydrocarbons, the proportion of which will not exceed 10 to 20% when the temperature of the reaction is maintained at from 45° to 65° C. When direct chlorination of isopropyl alcohol, to a further extent, say to pentachloracetone, is attempted, excessive quantities of chlorinated hydrocarbons are formed, which are chlorinated to a high degree giving them a high boiling range, and rendering separation from pentachloracetone very difficult.

The chloracetones dissolved in the upper layer of liquid in receiver 18, and those dissolved in the aqueous liquid in the absorbers may be separated by fractional distillation or preferably by adding to the chloracetone-containing liquid a suitable water soluble inorganic compound, such as NaCl, CaCl$_2$, or HCl, this process being designated "salting out". The separated chloracetones may be added to the combined heavier layer of liquid from the receiver and absorbers. The mixed chloracetones consist largely of dichloracetone (asym.) and trichloracetone, (such as 1.3.3) with relatively small, but varying quantities of tetrachloracetone and pentachloracetone, together with from 10 to 20% of chlorinated hydrocarbons. The mixture has a specific gravity varying from 1.45 to 1.50, and amounts to from 200 to 225% by weight of the isopropyl alcohol reacted upon. A practical separation of the chlorinated hydrocarbons may be effected by fractionally distilling off that portion of the mixture boiling below 118° C., the boiling point of unsymmetrical dichloracetone, the major portion of the chlor-hydrocarbons being thereby separated.

The upper layer of liquid in receiver 18 may be returned to the top of the tower in order to be again treated with chlorine, and this may be repeated again and again until the concentration of isopropyl alcohol is so far decreased that the reaction becomes ineffective. As the concentration of isopropyl alcohol decreases, heating becomes necessary to maintain the proper temperature of reaction in the tower.

The mixture of chloracetones may be utilized as such, for example, as solvents, or as an intermediate in the manufacture of pentachloracetone, as described in my co-pending application Ser. No. 421729, filed of even date herewith, or the mixture may be treated for the separation of the individual chloracetones, as described in my co-pending application Ser. No. 421,728, also filed of even date herewith.

It is apparent that the reaction between the chlorine and the isopropyl alcohol may be carried out by passing the chlorine into a body of isopropyl alcohol or in succession through a series of bodies of isopropyl alcohol, while maintaining the necessary temperature of reaction. If desired the reaction may be carried out with a superatmospheric pressure of chlorine.

Although the present invention has been described in connection with the details of a specific method for carrying it into effect and of apparatus for use in connection therewith, it is not intended that these details shall be regarded as limitations upon the scope of the invention, except in so far as included in the accompanying claims.

I claim:

1. In the process of forming chlorinated acetones, subjecting isopropyl alcohol to the action of chlorine while maintaining a temperature above 35° C. and not above 70° C.

2. In the process of forming chlorinated acetones, subjecting isopropyl alcohol to the action of chlorine in excess while maintaining a temperature of approximately 65° C.

3. In the process of forming chlorinated acetones, subjecting isopropyl alcohol to the action of chlorine in excess while maintaining a temperature of approximately 65° C., permitting the liquid products of reaction to separate by difference in density, and again subjecting the lighter liquid containing unreacted-upon isopropyl alcohol to the action of chlorine under like conditions.

4. In the process of forming chlorinated acetones, subjecting isopropyl alcohol to the action of chlorine while maintaining a temperature between 35° C. and 70° C. and absorbing the vapor products of reaction in water.

5. In the process of forming chlorinated acetones, subjecting isopropyl alcohol to the action of chlorine in the presence of water while maintaining a temperature of above 35° C.

6. In the process of forming chlorinated acetones, subjecting isopropyl alcohol to the action of chlorine while maintaining a temperature between 35 and 70° C., collecting the liquid products of reaction, separating the chlorinated acetones therefrom, absorbing the vapor products of reaction in water, separating the chlorinated acetones thereby absorbed, and combining the separated chlorinated acetones.

7. A mixture of chlorinated acetones derived from the chlorination of isopropyl alcohol and containing 10 to 20% of chlorinated hydrocarbons.

8. A mixture of chlorinated acetones comprising di and trichloracetones with some sym. tetra and pentachloracetone, said mixture having a specific gravity of 1.45 to 1.50 and containing not more than 20% of chlorinated hydrocarbons.

9. In the process of forming chlorinated acetones, subjecting isopropyl alcohol to the action of chlorine while maintaining a temperature between 35 and 70° C., collecting the liquid products of reaction, separating the chlorinated acetones therefrom, absorbing the vapor products of reaction in water, separating the chlorinated acetones thereby absorbed, combining the separated chlorinated acetones, and fractionally distilling off that portion of the chloracetone mixture boiling below 118° C., whereby the major portion of associated chlorinated hydrocarbons are removed.

HYYM E. BUC.